(12) United States Patent
Palmute (10) Patent No.: US 9,538,705 B1
(45) Date of Patent: Jan. 10, 2017

(54) CUTTER AND A BASE CUT ASSEMBLY (71) Applicant: Marchesan Implementos e Maquinas Agricolas Tatu S.A., Matao (BR)

(72) Inventor: Valter Palmute, Araras (BR)

(73) Assignee: Marchesan Implementos e Máquinas Agrícolas Tatú S.A., Matão -SP (BR)

( * ) Notice: Subject to any disclaimer, the term of this patent is extended or adjusted under 35 U.S.C. 154(b) by 0 days.

(21) Appl. No.: 14/906,213

(22) PCT Filed: Apr. 8, 2014

(86) PCT No.: PCT/BR2014/000115
§ 371 (c)(1),
(2) Date: Jan. 19, 2016

(87) PCT Pub. No.: WO2015/013786
PCT Pub. Date: Feb. 5, 2015

(30) Foreign Application Priority Data

Jul. 29, 2013 (BR) ...................... 10 2013 019208 2

(51) Int. Cl.
| | | |
|---|---|---|
| A01D 41/14 | (2006.01) | |
| A01D 46/08 | (2006.01) | |
| A01D 75/28 | (2006.01) | |
| A01D 34/66 | (2006.01) | |
| A01D 45/10 | (2006.01) | |
| A01D 101/00 | (2006.01) | |

(52) U.S. Cl.
CPC ............. *A01D 34/664* (2013.01); *A01D 45/10* (2013.01); *A01D 2101/00* (2013.01)

(58) Field of Classification Search
CPC ........ A01D 45/10; A01D 75/28; A01D 34/66; A01D 34/664; A01D 41/141

USPC .......................................................... 56/13.9
See application file for complete search history.

(56) References Cited

U.S. PATENT DOCUMENTS

| | | | | |
|---|---|---|---|---|
| 3,389,539 A | * | 6/1968 | Zweegers | A01D 34/66 56/13.6 |
| 3,911,651 A | * | 10/1975 | Schreiber | A01D 45/22 56/14.3 |
| 4,126,989 A | * | 11/1978 | Oosterling | A01D 34/66 56/11.9 |
| 4,170,098 A | * | 10/1979 | Moreno | A01D 45/10 56/13.4 |

(Continued)

FOREIGN PATENT DOCUMENTS

| | | |
|---|---|---|
| BR | MU8600817-4 U | 12/2007 |
| BR | PI1107149-0 A2 | 4/2013 |

OTHER PUBLICATIONS

International Searching Authority (ISA), International Search Report and Written Opinion for International Application No. PCT/BR2014/000115, Jul. 7, 2014, 8 pages, European Patent Office, The Netherlands.

(Continued)

*Primary Examiner* — Árpád Fábián-Kovács
(74) *Attorney, Agent, or Firm* — Alston & Bird LLP (57) ABSTRACT

The present invention relates to a cutter (1) for a base cut assembly (11) applied to a sugar-cane harvesting machine (100). The base cut assembly (11) comprises a support rod (2), which is provided with a substantially C-shaped geometric profile, this support rod (2) being associated to an axle (3) of the base cut assembly (1) simultaneously in its first portion and second portion (21; 29).

3 Claims, 6 Drawing Sheets

(56) References Cited

U.S. PATENT DOCUMENTS

| | | | | |
|---|---|---|---|---|
| 4,178,746 A | * | 12/1979 | Allely | A01D 34/661 56/13.6 |
| 4,253,294 A | * | 3/1981 | Zweegers | A01D 34/66 56/13.6 |
| 4,270,337 A | * | 6/1981 | Pinto | A01D 45/10 56/13.9 |
| 4,633,656 A | * | 1/1987 | Willinger | A01D 34/664 56/13.6 |
| 4,860,527 A | * | 8/1989 | Maarten | A01D 34/664 56/13.6 |
| 4,899,523 A | * | 2/1990 | Frumholtz | A01D 34/661 56/13.6 |
| 5,816,036 A | * | 10/1998 | Caillouet | A01D 45/10 56/14.3 |
| 6,062,009 A | * | 5/2000 | Caillouet | A01D 45/10 460/100 |
| 7,401,455 B1 | * | 7/2008 | Cleodolphi | A01D 45/10 56/10.2 E |
| 7,658,059 B2 | * | 2/2010 | Majkrzak | A01D 34/38 56/264 |
| 7,973,654 B2 | * | 7/2011 | Ehrhart | A01D 34/664 340/438 |
| 2010/0307121 A1 | * | 12/2010 | Marchini | A01D 75/28 56/63 |
| 2012/0110967 A1 | * | 5/2012 | Hinds | A01D 45/10 56/53 |
| 2014/0165522 A1 | * | 6/2014 | Braunbeck | A01D 45/10 56/10.6 |

OTHER PUBLICATIONS

International Preliminary Examining Authority, International Preliminary Report on Patentability, including Applicant's May 21, 2015, Response to the ISA's Written Opinion, for International Application No. PCT/BR2014/000115, Aug. 14, 2015, 9 pages, European Patent Office, Germany.

* cited by examiner

(Prior Art)

CUTTER AND A BASE CUT ASSEMBLY

CROSS REFERENCE TO RELATED APPLICATIONS

This application is a National Stage Application, filed under 35 U.S.C. 371, of International Application No. PCT/BR2014/000115 filed Apr. 8, 2014, which claims priority to Brazilian Application No. 10 2013 019208 2 filed Jul. 29, 2013, the contents of both of which are hereby incorporated by reference in their entirety.

BACKGROUND

Related Field

The present invention relates to a base cut assembly applied to a sugar-cane harvesting machine.

Description of Related Art

Mechanization in sugar-cane harvesting has been employed in the agricultural field in the past few decades as an alternative to manual harvesting. Besides the fact that manual harvesting constitutes a dangerous work for the life of an agricultural worker, the efficiency of this type of harvesting is inferior to that of mechanized harvesting.

With a view to achieving rapidity and efficiency in handling the harvested cane, sugar-cane harvesting machines have been developed for simultaneously cutting and processing the cut sugar-cane. These machines comprise various elements, such as: tip-cutter, helical lift, row-divider, tumbling roller, base cut assembly, lifting rollers, conveying rollers, cutting rollers, elevators, husk extractors (among other components), which have specific functions in sugar-cane processing, from harvest to transport and transfer, the vehicle that follows this machine during the harvesting.

An important component on the harvesting machine is the base cut assembly, the function of which is to receive the bundles of sugar-cane after the latter have been inclined by the tumbling roller of the machine. The base cut assembly is a mechanism that is arranged flush with the ground, emerging from the machine floor toward the plantation ground. The base cut assembly should cut as close to the ground as possible, so as to prevent waste of unharvested cane left on the ground. However, the base cut assembly may also not allow its cutting elements (its metallic blades) to come touch the plantation ground, because, if it does to, its blades may wear off or even break due to the abrasion which they undergo in contact with the particulate present in the soil.

The base cut assembly is connected—either directly or indirectly—to a vertical actuator, which is configured for promoting alteration in height of this component with respect to the soil. The control over vertical movement, that is, control of the height of this mechanism, is carried out in the command cabin of the harvester. When the machine operator notices an obstacle ahead of the harvesting machine (for example, a stone or a termite-hill), he activates an electronic command for raising the base cut assembly temporarily.

The prior-art base cut assembly is composed by two cutters, which rotate flush with the ground, cutting the bundles of sugar-cane at the plant base, before they penetrate into the harvesting machine. Each base cut assembly rotates inside a bearing, the function of which is to anchor the cutter axle to a raising roller table. This association between the base cut and the raising roller table may be viewed in document BR MU8600817-0 of Dácio Helene Junior.

An alternative configuration consists of the solution proposed in document BR PI1107149-4 of Deere & Company. In this prior-art configuration, the base cut assembly is fixed to a structure called "main frame", a movable structure that is arranged between the chassis and the operation cabin of the machine.

One of the problems of prior-art base cut assemblies is that their technology makes it very difficult for the harvester operator to control the height of the base cut disc. This is because from the operation cabin of the machine it is not possible to see all the unevenness of the ground. Besides, it is unfeasible to suggest that this operator should go through an entire plantation with his hands on the height control of the base cut disc, actuating this height control at every minor alteration present in the soil of this plantation. This causes this base cut assemblies now to leave unharvested cane in the plantation (wasting crop material) now to bump their blades with the plantation soil upon encountering unevenness in the plantation soil, damaging these elements and blunting their cutting edges.

Besides this disadvantage, the prior-art base cut assemblies are anchored onto the harvesting machine by means of bearings provided with a robust, resistant and heavy structure. These bearings are necessarily robust because they support the axle by contact with only one of its ends and the central part of the axle, leaving much of this piece free from contact with the bearing structure. When, for instance, a stone present in the soil hits the base cut disc, the force of this collision is multiplied by the whole extension of the free axle until it dissipates under the robustness of the bearing at the other axle end. By the low of linear moment, the larger the axle area exposed out of the bearing (that is, the longer the moment arm) the more resistant and heavier this bearing must be. Hence the robustness and high weight always present on the prior-art bearings.

However, the weight of an element comprised by an agricultural machine implies directly two drawbacks: increase in the total weight of the machine and the increase of its total manufacture cost. The latter is due to the fact that the heavier the component the more raw-material is employed to manufacture it.

It is also known that the total weight of an agricultural machine interferes directly with the compaction of the soil of a plantation. When this compaction occurs routinely, it may damage the plant routs and decrease the number of harvests capable of being carried out in the same plantation.

Thus, the prior art does not comprise a base cut assembly that is light, inexpensive, and is still capable of adapting to harvesting on uneven grounds, preventing waste of unharvested sugar-cane and damage to the metallic blades by accidental collision of this element with the plantation soil.

Objectives of the Invention

The present invention has the objective of providing a cutter for a base cut assembly, the cutter exhibiting a simple construction that is capable of reducing the weight and manufacture cost of sugar-cane harvesting machine without impairing the resistance and durability of this mechanism.

The present invention has the second objective of providing a base cat assembly that comprises two cutters, this base cut assembly exhibiting high resistance and durability, as well as low manufacture cost and final weight.

The represent invention has a further objective of providing a simple and effective method for controlling the height of the base cut assembly.

BRIEF SUMMARY

The objectives of the present invention are achieved by means of a cutter for a base cut assembly, the cutter being provided with an axle and a base cut disc, the cutter comprising a support rod provided with a substantially C-shaped geometric profile. This rod is associated to the cutter axle simultaneously at its first portion (which is arranged opposite the base cut disc) and at its second portion (which is arranged close to the base cut disc), said associations being provides by respective first roller bearing and second roller bearing.

The objectives of the present invention are achieved by means of a cutter for a base cut assembly that, in the second portion of its support rod, comprises a stroke-end sensor configured to detect the approaching of the base cut assembly to the plantation soil.

The objectives of the present invention are also achieved by means of a base cut assembly comprising two cutters provided with the above-descried characteristics.

BRIEF DESCRIPTION OF THE FIGURES

The present invention will now be described in greater detail with reference to an example of embodiment represented in the drawings. The figures show.

DETAILED DESCRIPTION OF VARIOUS EMBODIMENTS

Figure 5:
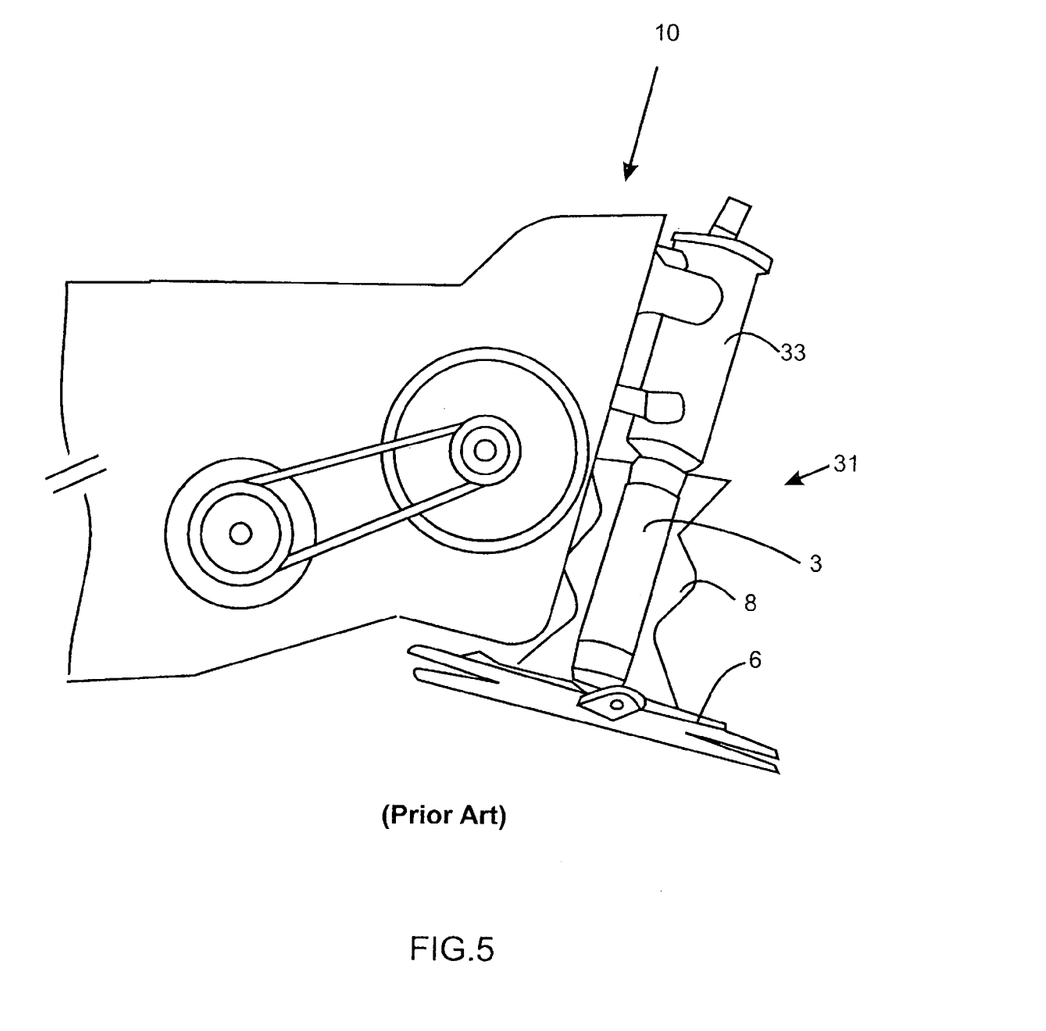
FIG. 5 is a side view of the prior-art cutter associated to a raising roller table.
Figure 6:
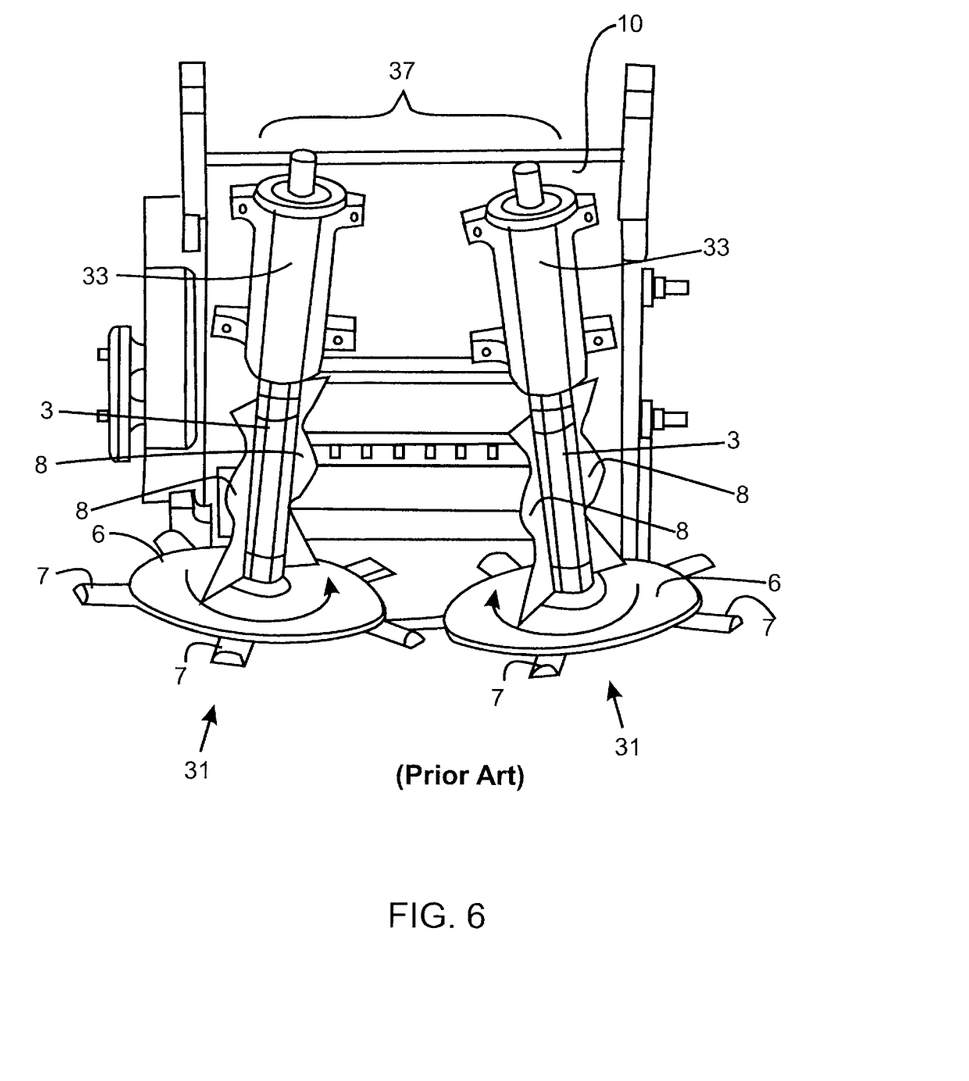
FIG. 6 is a front view of a prior-art base cut assembly associated to a raising roller table.

FIGS. 5 and 6 show how the cutters 1 of the prior-art base cut assembly 37 are secured to the cane harvesting machine in one of the possible prior-art embodiments.

The prior-art base cut assembly 37 (see FIGS. 5 and 6) is composed by two cutters 31, each comprising a base cut axle 3, a base cut bearing 33, a scraping guide 8, a base cut disc 6 and a plurality of metallic blades 7. Each base axle 3 is connected to a rotary motor (not shown in the figures) for carrying out the rotation motions.

The cutters 31 are used for cutting the sugar-cane, the movement direction of the axles 3 of each of them being oriented so that the movement tangent of these discs is oriented in the same direction that the sugar-cane follows when it comes into the harvesting machine. In other words, the disc 6 of the cutter 31 on the far right of the machine rotates in counterclockwise direction, while the disc 6 on the fur left of the machine rotates in clockwise direction, causing the cane not only to be cut, but also to be dragged into the harvesting machine.

The scraper guide 8 located at the lower part of the base cut axle 3 is constituted by a number of vertical waved border flaps. This scraping guide is connected concentrically to the axle 3, and its function is to aid in conducting the cut sugar-cane as far as the raising roller table 10. The base cut disc 6 is connected to the lower end of the base cut axle 3, performing the same rotary movement of the base cut axle 32. This base cut disc 6 comprises a plurality of metallic blades 7, which, upon rotating around the axle 3, cut the sugar-cane at the base of this plant.

Figure 1:
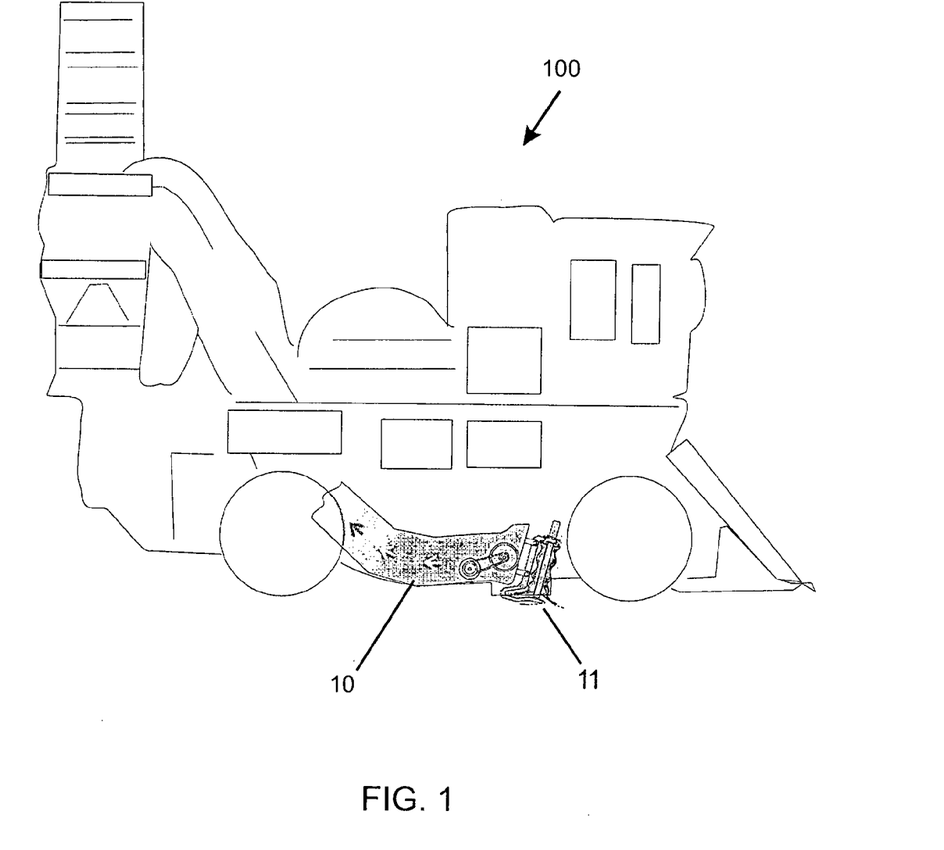
FIG. 1 is a side view of the sugar-cane harvesting machine of the present invention, showing the arrangement of the base cut assembly and the raising roller table with respect to the machine.

FIG. 1 shows the sugar-cane harvesting machine 100 of the present invention. In FIG. 1 it is possible to see the preferred location of the base cut assembly 11 of the present invention with respect to the harvesting machine 100. In the preferred embodiment, the base cut assembly 11 is associated to the raising roller table 10, but the present invention does not exclude other arrangement forms for this base cut assembly 11.

Figure 2:
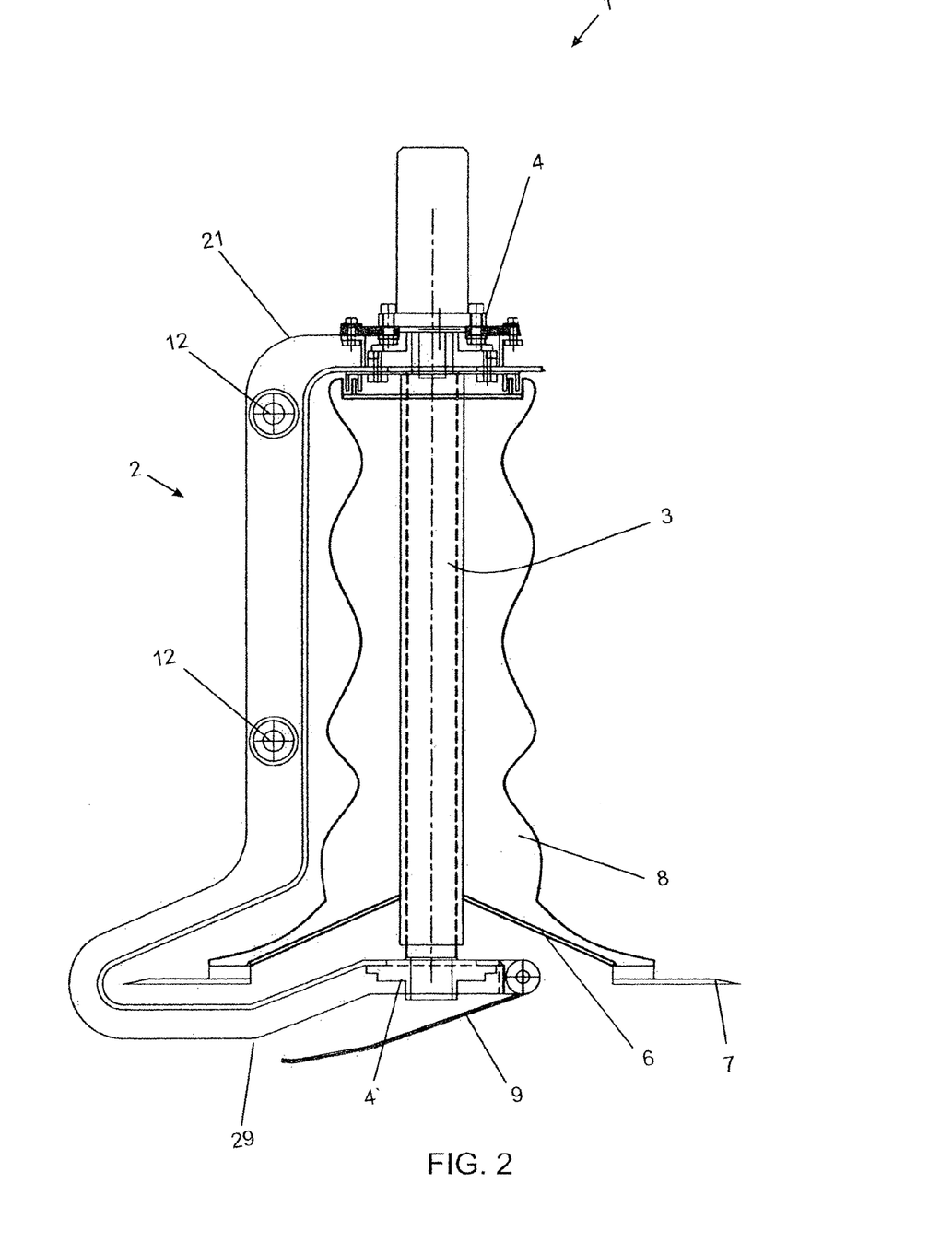
FIG. 2 is a side view of the cutter in the preferred embodiment of the present invention.

FIG. 2 discloses the main constructive details of a cuter 1 of the base cut assembly 11 in the preferred embodiment of the present invention. In its preferred embodiment, each of the cutters 1 of the invention is composed by a base cut axle 3, a scraper guide 8, a base cut disc 6, at least one metallic blade 7, a support rod 2, two roller bearings 4, 4' and a stroke-end sensor mechanism 9.

The base cut axle 3 is connected to a motor responsible for the rotary motion of the base cut axle 3 during the sugar-cane cutting operation.

The support rod 2 can be describes shortly as a C-shaped support. In its first portion 21 (the farthest portion from the disc 6) the support rod 2 is associated to the upper end of the axle 3, whereas in its second portion 29 (the opposite portion) this support rod 2 is associated to the end of the axle 3, which extends beyond the base cut disc 6. In both the association of the first portion 21 and the association of the second portion 29, the interface between the support rod 2 and the axle 3 is made by means of roller bearings 4, 4', these bearing being respectively first roller bearing 4 and second roller bearing 4'.

This solution, comprising the C-shaped support rod 2, which is associated simultaneously to two points of the axle 3, proves to be effective for two reasons, namely:

i. It solves the problem of weight and manufacture cost of the prior-art bearings 33, since they do not leave a portion of axle 3 far from the bearing, requiring a robust and heavy bearing 33 for bearing the arm moment forces exerted by the free axle 3 portion;

ii. It provides a point of fixation to a stroke-end sensor 9, the function of which is to orient automatically the rise and fall of the base cut assembly 1.

It should be noted that, without this support rod 2, it would not be possible to install a stroke-end sensor 9 at the lower end of the cutter 1. This is because ion the prior art the lower portion of the base cut assembly 31 is always describing a rotary motion.

Compulsorily, the support rod 2 should be arranged behind the base cut assembly 1, because otherwise it would block contact of the metallic blades 7 and of the scraping guide 8 with the sugar-cane.

Figure 4:
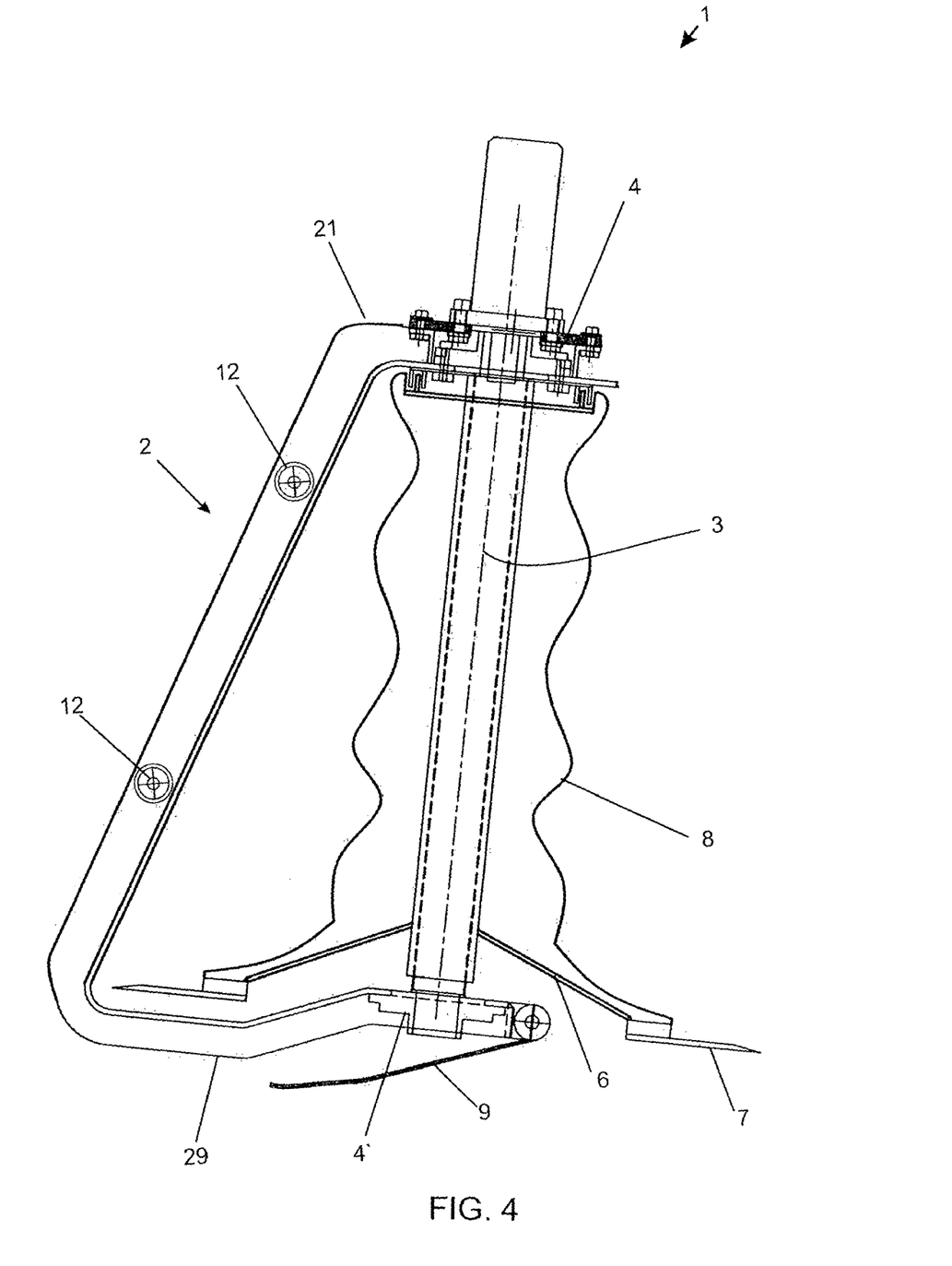
FIG. 4 is a side view of the cutter in alternative embodiment of the present invention.

Preferably, but not compulsorily, the support rod 2 describes a geometric form that accompanies the outer profile of the following elements: the metallic blades 7, the scraping guide 8 and the base cut disc 6. This is the embodiment shown in FIG. 2 of this specification. Anyway, other embodiments with profiles that do not follow the outer profile of these elements, but that foresee two points of association with the axle 3 do not depart the protection scope of the present invention. An example of an alternative embodiment of the present invention that discloses a support rod 2 that does not follow the outer profile of the elements metallic blade 7, scraping guide 8 and base cut disc 6 is the embodiment shown in FIG. 4 of this specification.

Preferably, the support rod 2 is built in a single piece, forged in a light and resistant metallic alloy.

Figure 3:
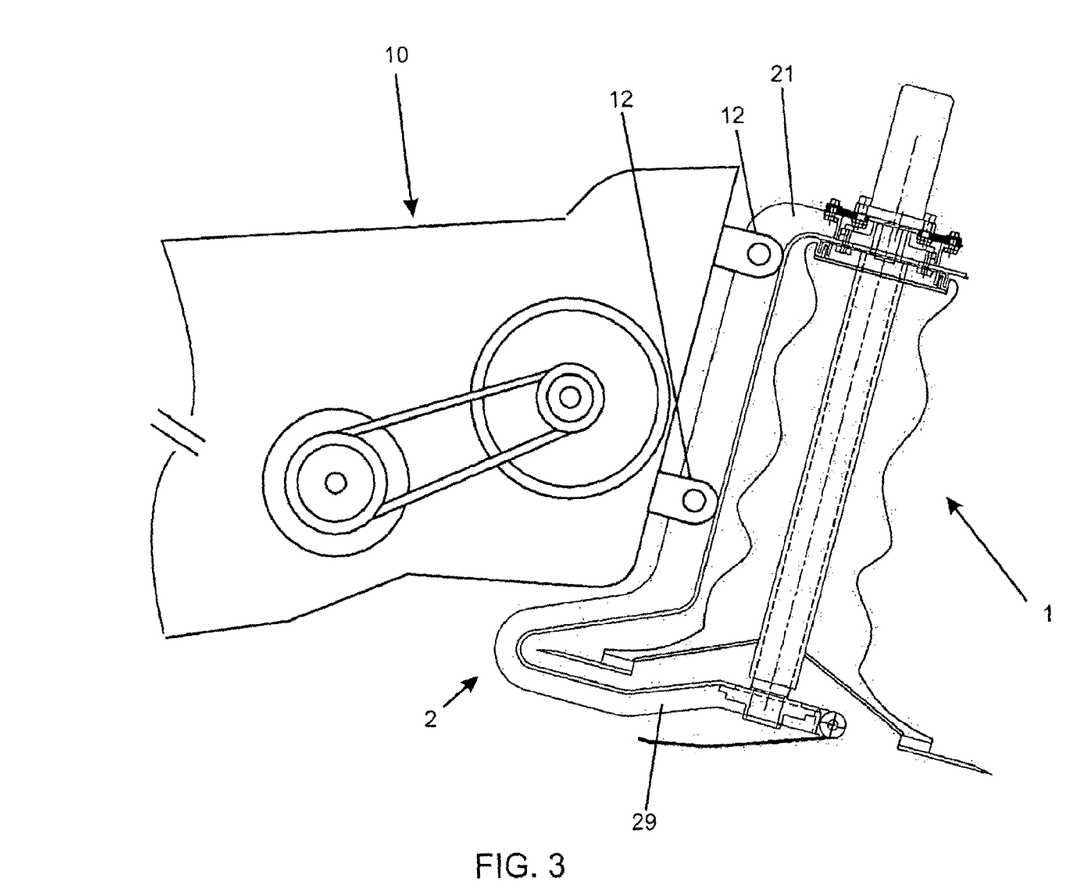
FIG. 3 is a side view of the cutter of the present invention associated to a raising roller table.

FIG. 3 shows a side view illustrating the fixation of a cutter 1 of the present invention to a raising roller table 10. The base cut assembly 1 is secured to the table 10 by association of at least one through-bore 12 present in the support rod 2.

It is evident that the base cut assembly 11 of the present invention is not necessarily associated to the raising roller table 10. In an alternative embodiment, the base cut assembly 11 may be associated to the harvesting-machine floor or to any structure present in the lower portion of this machine.

In a preferred embodiment, between the table 10 and the base cut assembly 1, there is an electronic actuator (not shown in the figures), configured for lowering or raising the base cut assembly 1 according to the commands of an electronic control unit.

This electronic control unit (ECU/UCE) uses, as input data, the electronic signals emitted by the stroke-end sensor 9. When the base cut assembly 1 comes close to the ground, the stroke-end sensor 9 rests on the soil surface and automatically sends an electronic signal to the UCE/ECU. Upon receiving this electronic signal, the UCE/ECU sends a command to said electromechanical actuator, causing the base cut assembly 11 to be moved away from the soil.

A preferred example of embodiment having been described, one should understand that the scope of the present invention embraces other possible variations, being limited only by the contents of the accompanying claims, which include the possible equivalents.

The invention claimed is:

1. A cutter for a base cut assembly applied to a sugar-cane harvesting machine, the cutter comprising:
    a table;
    an axle;
    a base cut disc;
    a single-piece support rod positioned between the table and base cut disc and behind the base cut assembly; and
    an actuator positioned between the table and the base cut disc,
    wherein:
        the support rod comprises a first portion having a first longitudinal axis and a second portion having a second longitudinal axis, the first and second longitudinal axes being parallel and spaced apart relative to one another such that the first and second portions of the support rod are likewise parallel and spaced apart relative to one another,
        the first portion is arranged opposite the base cut disc,
        the second portion extends beyond the base cut disc,
        the first and second portions of the support rod simultaneously provide a direct interface between the first and second portions of the support rod and the axle, said direct interface being provided respectively by first roller bearing and second roller bearing,
        the support rod further comprises, in its second portion, a stroke-end sensor configured to generate input data; and
        the actuator is configured, via a control unit and based upon the input data from the stroke-end sensor, to automatically command the rise and fall of the base cut assembly.

2. The cutter according to claim 1, wherein:
    the cutter further comprises a plurality of metallic blades and a scraping guide, and
    the geometric profile of the support rod extends beyond an outer profile defined by the metallic blades, the scraping guide, and the base cut disc.

3. A base cut assembly comprising two cutters as defined in claim 1.

* * * * *